(12) United States Patent
Heller et al.

(10) Patent No.: US 7,680,849 B2
(45) Date of Patent: Mar. 16, 2010

(54) MULTIPLE MEDIA TYPE SYNCHRONIZATION BETWEEN HOST COMPUTER AND MEDIA DEVICE

(75) Inventors: David Heller, San Jose, CA (US); Timothy Wasko, High River (CA); Jeff Miller, Mountain View, CA (US); Jesse Boettcher, San Jose, CA (US); Greg Marriott, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 10/973,925

(22) Filed: Oct. 25, 2004

(65) Prior Publication Data

US 2006/0100978 A1     May 11, 2006

(51) Int. Cl.
G06F 7/00 (2006.01)
G06F 17/00 (2006.01)

(52) U.S. Cl. ................................ 707/621; 707/913
(58) Field of Classification Search ............... 707/104.1
See application file for complete search history.

(56) References Cited

U.S. PATENT DOCUMENTS

| | | | |
|---|---|---|---|
| 3,990,710 A | 11/1976 | Hughes | |
| 4,528,643 A | 7/1985 | Freeny, Jr. | |
| 4,851,931 A | 7/1989 | Parker et al. | |
| 5,168,481 A | 12/1992 | Culbertson et al. | |
| 5,181,107 A | 1/1993 | Rhoades | |
| 5,191,573 A | 3/1993 | Hair | |
| 5,341,350 A | 8/1994 | Frank et al. | |
| 5,355,302 A | 10/1994 | Martin et al. | |
| 5,418,713 A | 5/1995 | Allen | |
| 5,428,735 A | 6/1995 | Kahl et al. | |
| 5,481,509 A | 1/1996 | Knowles | |
| 5,504,852 A | 4/1996 | Thompson-Rohrlich | |
| 5,535,381 A | 7/1996 | Kooper | |
| 5,559,945 A | 9/1996 | Beaudet et al. | |

(Continued)

FOREIGN PATENT DOCUMENTS

EP     0 917 077     5/1999

(Continued)

OTHER PUBLICATIONS

Bridgman, "Windows XP Expert Zone Community Columist", Using Windows Mobile-based Portable Media Centers and Windows Media Player 10, Aug. 25, 2004, 1-11.*

(Continued)

*Primary Examiner*—John E Breene
*Assistant Examiner*—Aleksandr Kerzhner

(57) ABSTRACT

Improved techniques for transferring media assets between a host computer and a media device are disclosed. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

31 Claims, 9 Drawing Sheets

U.S. PATENT DOCUMENTS

| | | |
|---|---|---|
| 5,561,604 A | 10/1996 | Buckley et al. |
| 5,566,353 A | 10/1996 | Cho et al. |
| 5,583,993 A | 12/1996 | Foster et al. |
| 5,587,404 A | 12/1996 | Kroner et al. |
| 5,616,876 A | 4/1997 | Cluts |
| 5,633,839 A | 5/1997 | Alexander et al. |
| 5,640,566 A | 6/1997 | Victor et al. |
| 5,666,530 A | 9/1997 | Clark et al. |
| 5,710,922 A | 1/1998 | Alley et al. |
| 5,714,971 A | 2/1998 | Shalit et al. |
| 5,721,949 A | 2/1998 | Smith et al. |
| 5,726,909 A | 3/1998 | Krikorian |
| 5,727,202 A | 3/1998 | Kucala |
| 5,734,823 A | 3/1998 | Saigh et al. |
| 5,739,451 A | 4/1998 | Winksy et al. |
| 5,740,134 A | 4/1998 | Peterson |
| 5,751,997 A | 5/1998 | Kullick et al. |
| 5,819,160 A | 10/1998 | Foladare et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,867,668 A | 2/1999 | Spirakis et al. |
| 5,875,110 A | 2/1999 | Jacobs |
| 5,897,642 A | 4/1999 | Capossela et al. |
| 5,918,213 A | 6/1999 | Bernard et al. |
| 5,918,303 A | 6/1999 | Yamaura et al. |
| 5,923,757 A | 7/1999 | Hocker et al. |
| 5,963,916 A | 10/1999 | Kaplan |
| 5,983,069 A | 11/1999 | Cho et al. |
| 5,995,098 A | 11/1999 | Okada et al. |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,061,306 A | 5/2000 | Buchheim |
| 6,125,369 A | 9/2000 | Wu et al. |
| 6,138,245 A | 10/2000 | Son et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 | 6/2001 | Dwek |
| 6,255,961 B1 | 7/2001 | Van Rzin et al. |
| 6,263,313 B1 | 7/2001 | Milsted et al. |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,345,256 B1 | 2/2002 | Milsted et al. |
| 6,356,971 B1 | 3/2002 | Katz et al. |
| 6,380,947 B1 | 4/2002 | Stead |
| 6,389,467 B1 | 5/2002 | Eyal |
| 6,407,750 B1 | 6/2002 | Gioscia et al. |
| 6,434,680 B2 | 8/2002 | Belknap et al. |
| 6,446,080 B1 | 9/2002 | Van Ryzin et al. |
| 6,452,609 B1 | 9/2002 | Katinsky et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Carini et al. |
| 6,664,981 B2 | 12/2003 | Ashe et al. |
| 6,665,803 B2 | 12/2003 | Lunsford et al. |
| 6,694,200 B1 | 2/2004 | Naim |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1 | 7/2004 | Hempleman et al. |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,874,037 B1 | 3/2005 | Abram et al. |
| 6,925,595 B1 | 8/2005 | Whitledge et al. |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,956,562 B1 | 10/2005 | O'Hara et al. |
| 6,959,288 B1 | 10/2005 | Medina et al. |
| 6,978,127 B1 | 12/2005 | Bulthuis et al. |
| 6,987,221 B2 | 1/2006 | Platt |
| 7,010,758 B2 | 3/2006 | Bate |
| 7,022,905 B1 | 4/2006 | Hinman et al. |
| 7,039,656 B1 | 5/2006 | Tsai et al. |
| 7,043,477 B2 | 5/2006 | Mercer et al. |
| 7,055,165 B2 | 5/2006 | Connelly |
| 7,069,058 B2 | 6/2006 | Kawashima |
| 7,075,000 B2 | 7/2006 | Gang et al. |
| 7,111,009 B1 | 9/2006 | Gupta et al. |
| 7,117,516 B2 | 10/2006 | Khoo et al. |
| 7,126,770 B1 | 10/2006 | Arai et al. |
| 7,136,934 B2 | 11/2006 | Carter et al. |
| 7,209,633 B1 | 4/2007 | Novak et al. |
| 7,228,298 B1 | 6/2007 | Raines |
| 7,272,385 B2 | 9/2007 | Mirouze et al. |
| 7,295,983 B2 | 11/2007 | Fujiwara et al. |
| 7,502,626 B1 | 3/2009 | Lemilainen |
| 2001/0004310 A1 | 6/2001 | Kono |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan et al. |
| 2002/0013784 A1 | 1/2002 | Swanson |
| 2002/0016968 A1 | 2/2002 | Nathan et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0073167 A1 | 6/2002 | Powell et al. |
| 2002/0080180 A1 | 6/2002 | Mander et al. |
| 2002/0113824 A1 | 8/2002 | Myers |
| 2002/0116082 A1 | 8/2002 | Gudorf |
| 2002/0118300 A1 | 8/2002 | Middleton et al. |
| 2002/0133515 A1 | 9/2002 | Kagle et al. |
| 2002/0138606 A1 | 9/2002 | Robison |
| 2002/0156921 A1 | 10/2002 | Dutta |
| 2002/0161865 A1 | 10/2002 | Nguyen |
| 2002/0174243 A1 | 11/2002 | Spurgat et al. |
| 2002/0174269 A1 | 11/2002 | Spurgat et al. |
| 2002/0194195 A1 | 12/2002 | Fenton et al. |
| 2002/0194309 A1 | 12/2002 | Carter et al. |
| 2003/0013493 A1 | 1/2003 | Irimajiri et al. |
| 2003/0014767 A1 | 1/2003 | Stumphauzer |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0055723 A1 | 3/2003 | English |
| 2003/0065802 A1 | 4/2003 | Vitikainen et al. |
| 2003/0074457 A1 | 4/2003 | Kluth |

| | | | |
|---|---|---|---|
| 2003/0079038 A1 | 4/2003 | Robbin et al. | |
| 2003/0093340 A1 | 5/2003 | Krystek et al. | |
| 2003/0098893 A1 | 5/2003 | Makinen | |
| 2003/0112279 A1 | 6/2003 | Irimajiri | |
| 2003/0149628 A1 | 8/2003 | Abbosh et al. | |
| 2003/0167318 A1 | 9/2003 | Robbin et al. | |
| 2003/0182315 A1 | 9/2003 | Plastina et al. | |
| 2003/0191756 A1* | 10/2003 | Oh | 707/3 |
| 2003/0197725 A1* | 10/2003 | Tuli | 345/738 |
| 2003/0206203 A1 | 11/2003 | Ly | |
| 2003/0210821 A1 | 11/2003 | Yogeshwar et al. | |
| 2003/0221541 A1 | 12/2003 | Platt | |
| 2004/0001395 A1 | 1/2004 | Keller et al. | |
| 2004/0001396 A1 | 1/2004 | Keller et al. | |
| 2004/0004338 A1 | 1/2004 | Benliyan | |
| 2004/0017997 A1 | 1/2004 | Cowgill | |
| 2004/0027930 A1 | 2/2004 | Kudo | |
| 2004/0055446 A1 | 3/2004 | Robbin et al. | |
| 2004/0076086 A1 | 4/2004 | Keller | |
| 2004/0078416 A1 | 4/2004 | Kawasaki et al. | |
| 2004/0083480 A1 | 4/2004 | Dodge | |
| 2004/0093274 A1 | 5/2004 | Vanska et al. | |
| 2004/0103102 A1 | 5/2004 | Nelson | |
| 2004/0113915 A1 | 6/2004 | Ohtsuki et al. | |
| 2004/0123725 A1 | 7/2004 | Kim | |
| 2004/0128277 A1 | 7/2004 | Mander et al. | |
| 2004/0139180 A1 | 7/2004 | White et al. | |
| 2004/0139844 A1 | 7/2004 | Tsuboi | |
| 2004/0148358 A1 | 7/2004 | Singh et al. | |
| 2004/0205028 A1 | 10/2004 | Verosub et al. | |
| 2004/0225762 A1 | 11/2004 | Poo | |
| 2004/0242224 A1 | 12/2004 | Janik et al. | |
| 2004/0261064 A1 | 12/2004 | Goldstein et al. | |
| 2005/0010616 A1 | 1/2005 | Burks | |
| 2005/0055444 A1 | 3/2005 | Venkatasubramanian | |
| 2005/0055718 A1 | 3/2005 | Stone | |
| 2005/0060264 A1 | 3/2005 | Schrock et al. | |
| 2005/0080915 A1* | 4/2005 | Shoemaker et al. | 709/231 |
| 2005/0102329 A1 | 5/2005 | Jiang et al. | |
| 2005/0149392 A1 | 7/2005 | Gold et al. | |
| 2005/0235015 A1 | 10/2005 | Abanami et al. | |
| 2005/0249080 A1 | 11/2005 | Foote et al. | |
| 2005/0262528 A1 | 11/2005 | Herley et al. | |
| 2005/0267803 A1 | 12/2005 | Patel et al. | |
| 2005/0278377 A1 | 12/2005 | Mirrashidi et al. | |
| 2006/0027080 A1 | 2/2006 | Schultz | |
| 2006/0036567 A1 | 2/2006 | Tan | |
| 2006/0159109 A1 | 7/2006 | Lamkin et al. | |
| 2006/0163358 A1 | 7/2006 | Biderman | |
| 2006/0168340 A1 | 7/2006 | Heller et al. | |
| 2006/0168351 A1 | 7/2006 | Ng | |
| 2006/0230081 A1 | 10/2006 | Craswell | |
| 2006/0247980 A1 | 11/2006 | Mirrashidi et al. | |
| 2007/0038941 A1 | 2/2007 | Wysocki et al. | |
| 2007/0067309 A1 | 3/2007 | Klein et al. | |
| 2007/0073728 A1 | 3/2007 | Klein et al. | |
| 2007/0074118 A1 | 3/2007 | Robbin et al. | |
| 2007/0084333 A1 | 4/2007 | Robbin et al. | |
| 2007/0088727 A1 | 4/2007 | Kindig | |
| 2007/0124680 A1 | 5/2007 | Robbin et al. | |
| 2007/0220552 A1 | 9/2007 | Juster et al. | |
| 2008/0028008 A1 | 1/2008 | Brunet et al. | |
| 2008/0086494 A1 | 4/2008 | Heller et al. | |
| 2008/0256378 A1 | 10/2008 | Guillorit | |
| 2009/0063496 A1 | 3/2009 | Cunningham et al. | |
| 2009/0063543 A1 | 3/2009 | Martin et al. | |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| KR | 10-2001-0063284 A | 7/2001 |
| KR | 10-2002-0011027 A | 2/2002 |
| KR | 10-2006-0035634 A | 4/2006 |
| WO | 94/08337 | 4/1994 |
| WO | WO 01/33569 | 6/1995 |
| WO | WO 95/16950 | 6/1995 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 03/036541 | 5/2003 |
| WO | WO 2004/004338 | 1/2004 |
| WO | WO 2004-004338 | 1/2004 |
| WO | 2004/057474 | 7/2004 |
| WO | WO 04/084413 | 9/2004 |
| WO | 2005073856 A2 | 8/2005 |
| WO | 2005-114472 A1 | 12/2005 |

OTHER PUBLICATIONS

MG-25, "Portable MPEG4 Player (MG-25)" (http://web.archive.org/web/20040825143455/www.microtronics.ca/mediagate.pdf), Jul. 29, 2004, 1-3.*

Iriver, "PMP140/120" (http://www.iriverpolska.pl/files/1904804326/datasheet%20iriver%20PMP%20series%20english.pdf), Sep. 13, 2004, 1-2.*

U.S. Appl. No. 11/138,004, filed May 25, 2005.

U.S. Appl. No. 11/114,914, filed Apr. 25, 2005.

U.S. Appl. No. 11/454,060, filed Jun. 14, 2006.

Office Action from European Patent Office for European Patent Application 05 823 337.0 dated Feb. 21, 2008.

Office Action from Chinese Patent Office for Chinese Patent Application 200580036575.8 dated May 23, 2008 (with translations).

International Search Report and Written Opinion for PCT/US2005/038529, mailed May 24, 2006.

Nutzel et al., "Sharing Systems for Future HiFi Systems", Proceedings of the Fourth International Conference on Web Delivering of Music, Sep. 13, 2008, 8 pgs.

Wikipedia: "iTunes", www.wikipedia.com, May 9, 2005, 6 pages.

"Diamond Multimedia Announces Rio PMP300 Portable MP3 Music Player", Press Release, http://news.harmony-central.com/Newp/1998/Rio-PMP300.html, Sep. 14, 1998, 4 pgs.

M. Nilsson;IDS tag version 2.3.0; Feb. 3, 1999, http://www.id3lib.org/id3v2.3.0.html.

M. Nilsson;IDS tag verions 2.4.0—Main Structure; Nov. 1, 2000; http://www.id3.org/id3v2.4.0-structure.

"iTunes Celebrates Its First Anniversary; Over 70 Million Songs Purchased," Apr. 28, 2004, http://www.apple.com/pr/library/2004/apr/28itunes.html.

Breen, Christopher, "iMixing it Up: Sharing Your Sounds," Sep. 17, 2004, http://playlistmag.com/help/2004/09/imixhowto/index.php.

Kawamoto et al., "On 1st Birthday, iTunes Unwraps New Features," Apr. 28, 2004, http://news.com.com/On+1st+birthday,+iTunes+unwraps+new+features/2100-1027_3-5201598.html.

U.S. Appl. No. 10/936,233, entitled "Method and system for dynamically populating groups in a develper environment", filed Sep. 7, 2004.

U.S. Appl. No. 11/238,587, entitled "Graphical user interface and methods of use thereof in a multimedia player", filed Sep. 28, 2005.

U.S. Appl. No. 11/679,082, entitled "Data Synchronization with Host Device in Accordance with Synchronization Preferences", filed Feb. 26, 2007.

U.S. Appl. No. 11/679,091, entitled "Background Data Transmission between Media Device and Host Device", filed Feb. 26, 2007.

U.S. Appl. No. 11/679,114, entitled "Data Backup for Mobile Device", filed Feb. 26, 2007.

U.S. Appl. No. 11/757,204, entitled "Intelligent synchronization of media player with host computer", filed Jun. 1, 2007.
U.S. Appl. No. 11/767,443, entitled "Widget Synchronization in Accordance with Synchronization Preference", filed Jun. 22, 2007.
U.S. Appl. No. 11/830,645, entitled "Multiple media type synchronization between host computer and media device", filed Jul. 30, 2007.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", INTERCHI '93, pp. 414-417, Apr. 24-29, 1993.
Lowery Daryl, "Random-Access Digital Audio—Recording Systems", pp. 68-71, Jun. 1992.
Sadie Master System, Product Brochure, Studio audio Digital Equipment Inc., 2 pgs.
Rcs Works-Cart Wall User's Guide and Reference Manual, pp. 1-83, Feb. 7, 1993.
"Digital Audio Just Got Easier!", CartWorks Digital Audio Systems, dbm Systems, Inc.
"CartWorks File Utilities User's Manual", dbm Systems, Inc., pp. 1-8.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11.
"CartWorks On-Demand Editor User's Manual", dbm Systems, Inc., pp. 1-7.
"CartWorks Script Editor User's Manual v3.12", dbm Systems, Inc., pp. 1-26.
"CartWorks Spot Set Editor User's Manual", dbm Systems, Inc., pp. 1-11.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.
"Broadcast Tools: SpotBase, Playlist & TapeBase", ASC Audio Video Corporation, pp. 1-2.
"VR 300 Advanced Broadcast Video Server", ASC Audio Video Corporation, pp. 1-9.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10.
WinDecks, User Instructions, Gravis Computer Technology Ltd., pp. 1-14.
RCA Lyra User's Guide, RD2201/2202/2204, www.lyrazone.com, pp. 1-37.
Lyra, Personal Digital Player, RCA, Product Box.
Compaq Computer Corp., copyright 1991, Personal Jukebox User Manual, pp. 1-29, 1991.
"About MusicMatch Jukebox," MusicMatch Jukebox v4 Help, pp. 1-4.
RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#, 1999.
TuneBase 100 User Guide, A CD Library Management System, Escient, Inc. copyright 1999.
TuneBase Pro Mk-II User's Guide, Escient, Inc.
Window's Media Player 6.4, Microsoft Corp., copyright 1999, software available at http://www.oldversion.com/program/php?n=wmp See also Windows Media Player 6.4 Software Official website at http:www.microsoft.com/windows/windowsmedia/player/version64/default.aspx.
Replay Gain, "Replay Gain—A proposed Standard," Oct. 7, 2001, available from http://replaygain.hydrogenaudio.org/index.html and http://replaygain.hydrogenaudio.org/outline.html.
Glenn Fleishman, "Handheld iPod joins MP3 band a bit late, but is standout player," Nov. 6, 2001, http://seattletimes.nwsource.com/html/businesstechnology/134361811_ptmacc040.html.

"Hewlett Packard Jornada 525 Color Pocket PC," downloaded Jan. 25, 2002, http://www.pc4d.com/electronics/products/56/jornada_525_color_pocket_pc.shtml.
iTunes, Digital Music for your Mac, Apple Computer, Inc., downloaded Oct. 22, 2001, http://www.apple.com/itunes/.
"Rio Portable Music Player," Web Review, downloaded Jan. 25, 2002, http://www.webreviews.com/9901/rio.html.
Andy Lindauer, "What's in your Pocket?," Edgereview, downloaded Jan. 25, 2002, http://www.edgereview.com/print.cfm?Type=aag&ID=286.
Handbook for Palm™ m500 Series Handhelds, User Manual, Aug. 25, 2003.
International Search Report and Written Opinion for corresponding PCT application no. PCT/US2005/038529 dated May 24, 2006 (APL1P354).
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
Vetro et al., "Media Conversions to Support Mobile Users," IEEE Canadian Conference on Electrical and Computer Engineering, Piscataway, NJ, May 13, 2001, pp. 607-612.
Zheng et al., "MobiGATE: a mobile gateway proxy for the active deployment of transport entities," Proceedings of the 2004 International Conference on Parallel Processing, Piscataway, NJ, Aug. 15, 2004.
De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Apple Introduces iTunes—World's Best and Easiest To Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0" —MP3 Player and Encoder for Macintosh by Jeffrey Robbin, Bill Kincaid and Dave Heller, manual by Tom Negrino, published by Casady & Greene, Inc., 2000.

"Digital Still Cameras—Downloading Images to a Computer," Mimi Chakarova et al., Multi-Media Reporting and Convergence, 2 pgs, May 9, 2005.

Office Action from EP Application No. 05823337.0, mailed Jan. 27, 2009.

Notification of Second Office Action for Chinese Patent Application 200580036575.8, dated Sep. 18, 2009.

Torrone, Phillip, How-To: Getting Podcasts on a Portable Media Center (and other Windows Media Devices, Oct. 2004.

Etchison, "Accelerated Discrete Adjustment of the Parameters of a Process", IBM Technical Disclosure Bulletin, vol. 15, No. 5, Oct. 1, 1972, 2 pgs.

Skarlatos et al., "Sprite Software Sprite Backup 5.0", Internet Publication, www.pocketnow.com/index.php?a+portal_print&t=review&id=788, Mar. 6, 2005.

* cited by examiner

MULTIPLE MEDIA TYPE SYNCHRONIZATION BETWEEN HOST COMPUTER AND MEDIA DEVICE

CROSS-REFERENCE TO RELATED APPLICATIONS

This application is related to: (i) U.S. application Ser. No. 10/973,657, filed Oct. 25, 2004, and entitled "IMAGE SCALING ARRANGEMENT," which is hereby incorporated herein by reference; (ii) U.S. application Ser. No. 10/987,649, filed Nov. 12, 2004, and entitled "WIRELESS SYNCHRONIZATION BETWEEN MEDIA PLAYER AND HOST DEVICE," which is hereby incorporated herein by reference; (iii) U.S. application Ser. No. 10/277,418, filed Oct. 21, 2002, and entitled "INTELLIGENT INTERACTION BETWEEN MEDIA PLAYER AND HOST COMPUTER," which is hereby incorporated herein by reference; and (iv) U.S. application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to media devices and, more particularly, to synchronization or management of media on media devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes tend to utilize filenames and modification dates to determine whether files need to be copied between the devices.

In the case of media players, such as music players, files are typically moved between a host computer and a media player through use of a drag and drop operation, like that conventionally done with respect to copying of a data file from a Windows desktop to a floppy disk. Hence, a user of the media player manually initiates the synchronization for individual media assets. As a consequence, synchronization also tends to be tedious and time consuming for users. Synchronization tends to be slow because data is transmitted between devices over a slow link. More recently, synchronization of a music player with a host computer has been able to be automatically initiated once a bus connection over a peripheral cable connects the music player to the host computer. As an example of such a system, see U.S. Patent Publication No.: 2003/0167318 A1. However, such automated synchronization involves media assets of a single media type, namely songs. Other media types, such as images, present new and different challenges when attempting to provide synchronization.

Thus, there is a need for improved techniques for improved approaches to synchronize media devices and host computers.

SUMMARY OF THE INVENTION

The invention relates to improved techniques for transferring media assets between a host computer and a media device. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

The invention can be implemented in numerous ways, including as a method, system, device, apparatus, or computer readable medium. Several embodiments of the invention are discussed below.

As a method for providing media assets to a media device from a host computer, one embodiment of the invention includes at least the acts of: obtaining media device capabilities for the media device; identifying original media assets on the host computer that are to be copied to the media device; determining media formats appropriate for the media device based on the media device capabilities; generating, for each of the original media assets, a set of formatted media assets in accordance with the media formats; and copying the set of formatted media assets to the media device.

As a method for synchronizing media assets between a host computer and a media device, one embodiment of the invention includes at least the acts of: identifying media assets at the host computer to be synchronized to the media device, the media assets being associated with one or more media collections; determining which of the identified media assets are not already stored on the media device; determining a priority for each of the one or more media collections that include the determined media assets; and copying the determined media assets of the one or more media collections from the host computer to the media device, the copying being performed on a media collection basis in accordance with the priority for the associated media collection, and being performed only to the extent of available storage space on the media device.

As a method for synchronizing media assets between a host computer and a media device, another embodiment of the invention includes at least the acts of: identifying media assets residing on the host computer that are to be copied to the media device; determining whether the media device has adequate available storage capacity to store the identified media assets; determining priorities associated with the identified media assets; reducing the identified media assets that are to be copied to the media device in accordance with the priorities when it is determined that the media device has inadequate available storage capacity to store the identified media assets; and copying the identified media assets to the media device.

As a method for copying media assets from a host computer to a media device, one embodiment of the invention includes at least the acts of: identifying a number of media assets of a first type to be copied from the host computer to the media device; determining whether the media device has adequate available storage capacity to store the identified media assets of the first type; reducing the number of media assets of the first type to be copied when it is determined that the media device has inadequate available storage capacity; copying the identified media assets of the first type to the media device; identifying a number of media assets of a second type to be copied from the host computer to the media device; determining whether the media device has adequate available storage capacity to store the identified media assets of the second type, with or assuming that the copying has already been performed; reducing the number of media assets of the second type to be copied when it is determined that the media device has inadequate available storage capacity; and copying the identified media assets of the second type to the media device.

As a computer readable medium including at least computer program code for providing media assets to a media device from a host computer, one embodiment of the invention includes at least: computer program code for obtaining media device capabilities of the media device; computer program code for identifying original media assets on the host computer that are to be copied to the media device; computer program code for determining media formats appropriate for the media device based on the media device capabilities; computer program code for generating, for each of the original media assets, a set of formatted media assets in accordance with the media formats; and computer program code for copying the set of formatted media assets to the media device.

As a computer readable medium including at least computer program code for synchronizing media assets between a host computer and a media device, one embodiment of the invention includes at least: computer program code for identifying media assets at the host computer to be synchronized to the media device, the media assets being associated with one or more media collections; computer program code for determining which of the identified media assets are not already stored on the media device; computer program code for determining a priority for each of the one or more media collections that include the determined media assets; and computer program code for copying the determined media assets of the one or more media collections from the host computer to the media device, such copying being performed on a media collection basis in accordance with the priority for the associated media collection, and being performed only to the extent of available storage space on the media device.

As a computer readable medium including at least computer program code for synchronizing media assets between a host computer and a media device, another embodiment of the invention includes at least: computer program code for identifying media assets residing on the host computer that are to be copied to the media device; computer program code for determining whether the media device has adequate available storage capacity to store the identified media assets; computer program code for determining priorities associated with the identified media assets; computer program code for reducing the identified media assets that are to be copied to the media device in accordance with the priorities when it is determined that the media device has inadequate available storage capacity to store the identified media assets; and computer program code for copying the identified media assets to the media device.

As a computer readable medium including at least computer program code for copying media assets from a host computer to a media device, one embodiment of the invention includes at least: computer program code for identifying a number of media assets of a first type to be copied from the host computer to the media device; computer program code for determining whether the media device has adequate available storage capacity to store; computer program code for identifying a number of media assets of a second type to be copied from the host computer to the media device; computer program code for determining whether the media device has adequate available storage capacity to store the identified media assets of the first type and the identified media assets of the second type; computer program code for reducing the number of media assets of the second type to be copied when it is determined that the media device has inadequate available storage capacity for both the identified media assets of the first type and the identified media assets of the second type; and computer program code for copying the identified media assets of the first type and the second type to the media device.

As a computing apparatus for providing media assets to a media device, one embodiment of the invention includes at least: an input/output interface that detects connection with the media device, a data store that stores the media assets, and a processor. The processor is configured to obtain media device capabilities of the media device, identify original media assets on the host computer that are to be copied to the media device, determine media formats based on the media device capabilities, generate, for each of the original media assets, a set of formatted media assets in accordance with the media formats, and copy the set of formatted media assets to the media device.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for transferring media assets between a host computer and a media device. The transfer of media assets between a host computer and a media device can be referred to as synchronization. According to one aspect of the invention, media assets being transferred can be formatted (e.g., rendered) in advance at the host computer and then delivered to the media device. According to another aspect of the invention, media assets can be grouped into collections and transferred on a collection basis. According to still another aspect of the invention, media assets to be transferred can be limited based on an amount of storage capacity available at the media device. According to yet another aspect of the invention, media assets of different media types can be transferred in accordance with different priorities.

Embodiments of this aspect of the invention are discussed below with reference to FIGS. 1-6. However, those skilled in the art will readily appreciate that the detailed description given herein with respect to these figures is for explanatory purposes as the invention extends beyond these limited embodiments.

Figure 1:
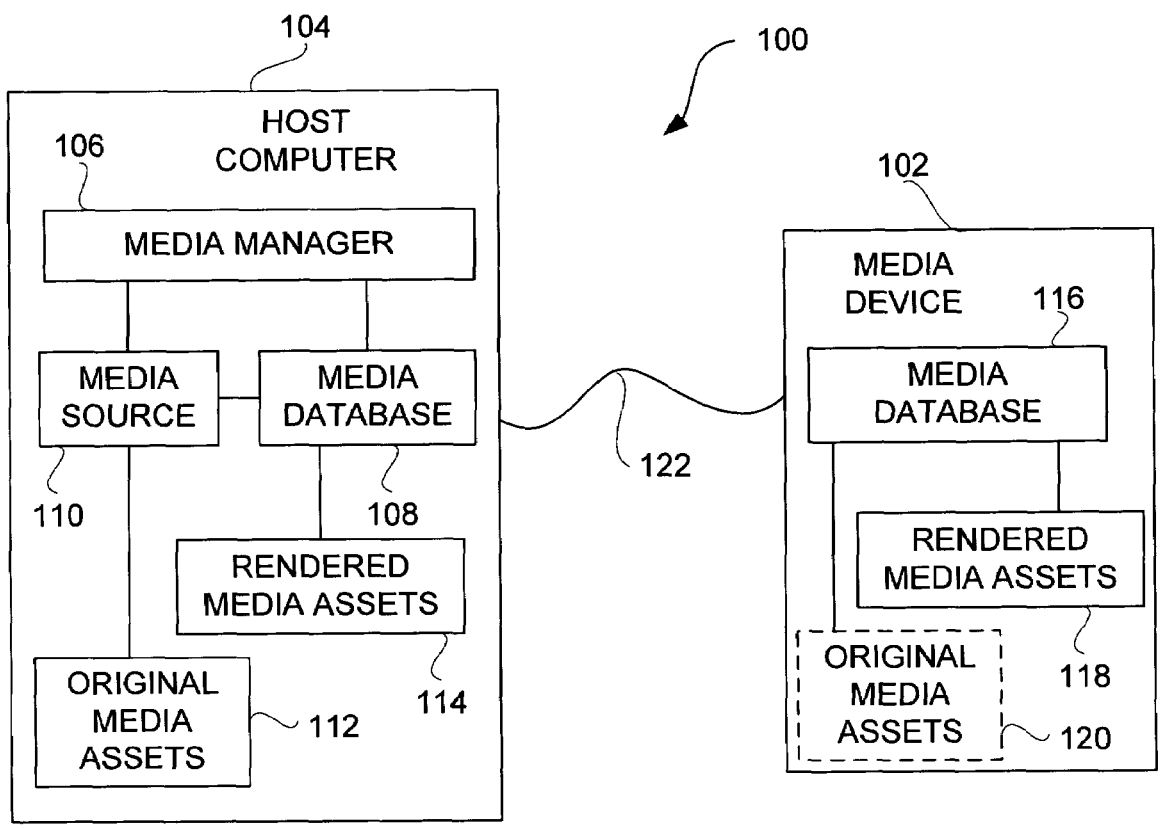
FIG. 1 is a block diagram of a synchronization system according to one embodiment of the invention.

FIG. 1 is a block diagram of a synchronization system 100 according to one embodiment of the invention. The synchronization system 100 includes a media device 102 and a host computer 104. The media device 102 is, for example, a portable, battery-operated media player. The host computer 104 includes a media manager 106. The media manager 106 enables a user of the host computer 104 to manage media assets stored on the host computer 104. For example, the media manager 106 facilitates a user with browsing, organizing, viewing, playing or other operations with respect to various media assets. In one embodiment, the media manager 106 is a media management application.

The various media assets can be of one or more different media types. One exemplary type of media asset is an audio file (e.g., song). Another exemplary type of media asset is an image file (e.g., photo). Still another exemplary type of media asset is a video file (e.g., movie). The media assets can also be grouped into collections. One example of a collection is an album.

The host computer 104 further includes a media database 108 and a media source 110. The media source 110 references original media assets 112 that are stored in a data storage device (e.g., disk drive, FLASH memory) of the host computer 104. The media database 108 stores media information pertaining to the original media assets 112. To facilitate use of the original media assets 112 on the media device 102, the media manager 106 operates to produce rendered media assets 114 from the original media assets 112. The rendered media assets 114 are formatted for use by the media device 102.

The media device 102 includes a media database 116 and rendered media assets 118. The media device 102 may also include original media assets 120. The rendered media assets 118 are copies of some or all of the rendered media assets 114, and the original media assets 120 are copies of some or all of the original media assets 112. Typically, the media player 102 will include a data storage device (e.g., disk drive, FLASH memory) for storing media assets, a cache memory for storing a media asset in-use, a screen display for displaying information to a user, and a processor (e.g., microprocessor) for controlling operation of the media device 102.

A peripheral cable 122 provides a data path (or data link) between the media device 102 and the host computer 104. Typically, the peripheral cable 122 couples together data ports provided on the media device 102 and the host computer 104. The peripheral cable 122 provides a peripheral bus that couples the media device 102 to the host computer 104. The peripheral bus, for example, could be a FIREWIRE bus or a Universal Serial Bus (USB).

A synchronization operation between the media assets stored on the host computer 104 and the media assets stored on the media device 204 can be achieved in a sophisticated manner through comparison of media information stored in the respective media databases 108 and 116. The media information can pertain to one or more types of media assets. When comparison of the media information from the respective databases 108 and 116 indicates that there is a particular media asset resident on the host computer 104 but not on the media device 102, then the particular media asset can be transmitted (downloaded) to the media player over the peripheral cable 122. On the other hand, when the comparison of the media information from the respective databases 108 and 116 indicates that a particular media asset is resident on the media device 102 but not on the host computer 104, then the particular media asset can be either removed (deleted) from the media device 102 or transmitted (e.g., uploaded) over the peripheral cable 122 to the host computer 104. Hence, by providing the media device 102 with the media database 116, more sophisticated synchronization and management of media content is enabled. In one embodiment, the media information includes media attributes of the media assets which can be compared to determine which media assets are to be transferred. In one example, the media attributes include at least a title and an artist name for media assets that are audio files. In another example, the media attributes include an identifier, a modification date and a size for media assets that are image files.

The media database 116 also allows the media device 102 to present a user interface to the user that is more sophisticated then conventional approaches. Such a user interface can be presented on the screen display of the media device 102. The user interface can, for example, allow the user of the media device 202 to browse, sort, search, play, view, etc. the media assets resident on the media device 102. The user interface can also allow the user of the media device 102 to download (add) or delete (remove) media assets from the media device 102. When the media assets are images that are to be viewed, the media device is able to rapidly display the media assets using the associated one of the rendered media assets (previously formatted) for display on the screen display.

The media manager 106 also has a user interface that allows a user to browse, sort, search, play, view, make playlists, burn Compact Discs (CDs), make collections (e.g., albums), etc. the media assets resident on the host computer 204. The user interface can also allow the user of the host computer 104 to download (add) or delete (remove) media assets from the host computer 104. In one embodiment, the media manager 106 and its associated user interface are provided by iTunes, version 2.0, from Apple Computer, Inc. of Cupertino, Calif.

In one embodiment, the media device is a portable computing device dedicated to processing media such as audio, video or images. For example, the media device 102 can be a music player (e.g., MP3 player), a game player, a video player, a video recorder, a camera, an image viewer and the like. These devices are generally battery operated and highly portable so as to allow a user to listen to music, play games or video, record video, play video, take pictures or view pictures wherever the user travels. In one implementation, the media device 102 is a handheld device that is sized for placement into a pocket or hand of the user. By being handheld, the media device 102 is relatively small and easily handled and utilized by its user. By being pocket sized, the user does not have to directly carry the media device 102 and therefore the media device 102 can be taken almost anywhere the user travels (e.g., the user is not limited by carrying a large, bulky and often heavy device, as in a portable computer). Furthermore, the media device 102 may be operated by the user's hands without the need for a reference surface such as a desktop.

According to one embodiment of the invention, the media device is a media player, and the media content on the media player is detailed in a media database residing on the media player. The host computer also stores a media database of the media content on the host computer. Then, on synchronization, the media information stored in the respective media databases can be compared to determine which, if any, media assets are to be copied from the host computer to the media player. For example, the media assets can pertain to media files for songs, and the media information from the respective databases being compared might include song title, album name and artist name. As another example, the media assets can pertain to media files for images, and the media information from the respective databases being compared might include an image identifier, a modification date and a file size. As a result, the synchronization process is able to be more intelligently performed. Media assets can also be removed (or deleted) from the media player if no longer present on the host computer. In other embodiments, media assets can additionally or alternatively be copied from the media player to the host computer.

Figure 2:
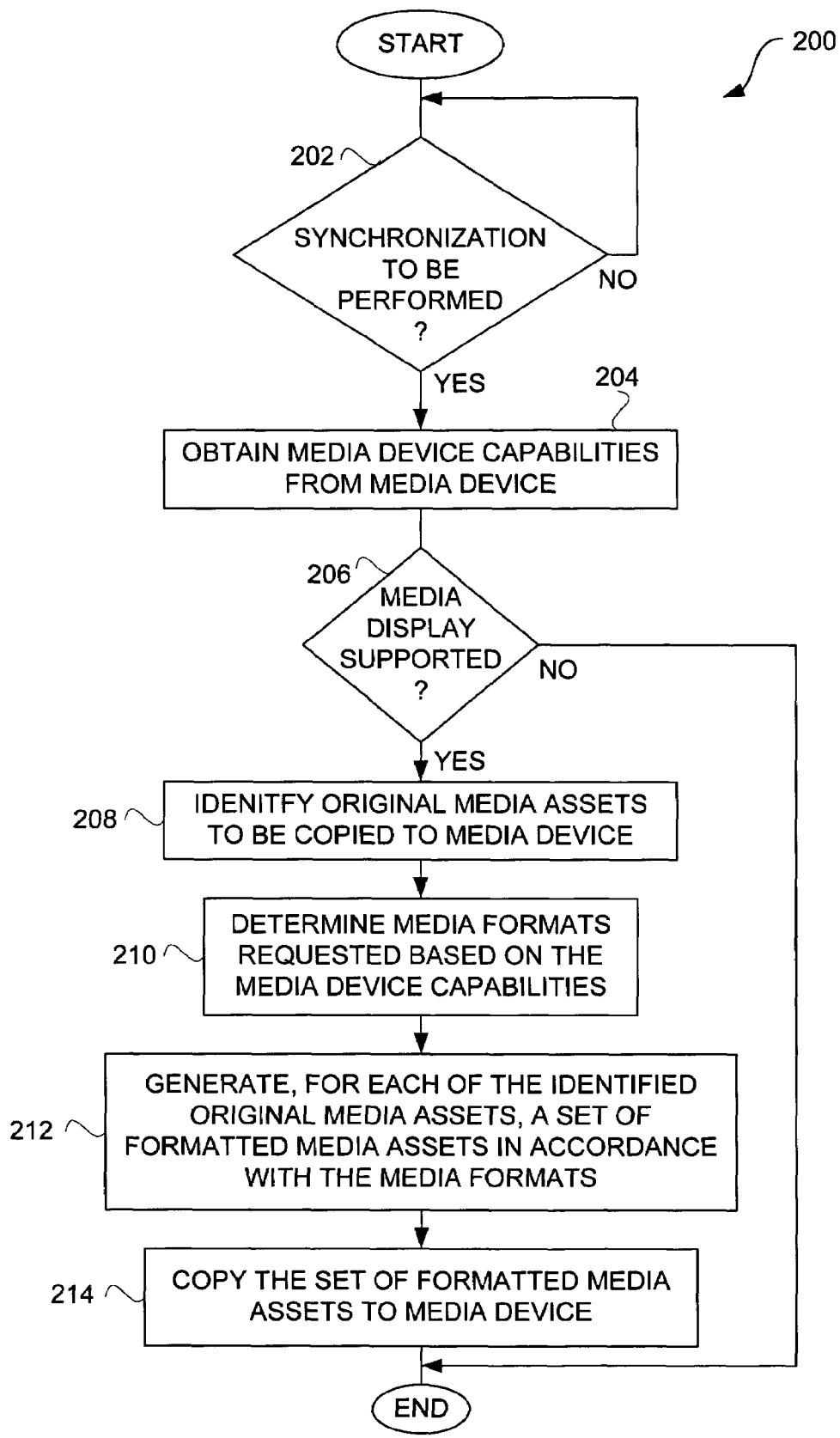
FIG. 2 is a synchronization process according to one embodiment of the invention.

FIG. 2 is a synchronization process 200 according to one embodiment of the invention. The synchronization process 200 is performed by a media manager, such as the media manager 106 within the host computer 104 illustrated in FIG. 1.

The synchronization process 200 begins with a decision 202 that determines whether synchronization is to be performed. When the decision 202 determines that synchronization is not to be performed, the synchronization process 200 merely waits until an appropriate time to perform synchronization. In this regard, the synchronization process 200 can be deemed invoked once synchronization is to be performed. As an example, synchronization can be performed at the request of a user of the host computer or automatically when a media device is connected to the host computer.

In any case, once the decision 202 determines that synchronization is to be performed, media device capabilities are requested 204 from the media device. The media device is aware of its media device capabilities and can supply its media device capabilities to the host computer upon request. The media device capabilities can define characteristics, capabilities and/or preferences for the media device. As an example, the media device capabilities can indicate media types that are supported by the media device, display formats supported or desired by the media device, and available storage capacity for additional media assets. In an alternative embodiment, the media device capabilities can be stored on the host computer and accessed using an identifier provided by the media device.

Next, a decision 206 determines whether media display is supported by the media device. The display of the media assets be the media device can be directly on a display device of the media device or indirectly by an external display device controlled by the media device. Here, it is assumed that some of media devices that can couple to a host computer are able to display media, but others are not. When the media device does not support media display, the synchronization process 200 is complete and ends because it is assumed that the media assets being synchronized by the synchronization process 200 pertain to the display of such media assets.

On the other hand, when the decision 206 determines that media display is supported by the media device, original media assets residing on the host computer that are to be copied to the media device are identified 208. As discuss in greater detail below, the original media assets to be copied to the media device can be influenced by user selections as well as those media assets already present on the media device.

In addition, media formats requested are determined 210 based on the media device capabilities. Here, the media device capabilities can indicate one or a plurality of media formats, such as display formats, that are desired by the media device. For example, the media device can include in the media device capabilities those display formats (e.g., rendered formats) that the media device supports. Then, a set of formatted media assets (e.g., rendered media assets) can be generated 212 for each of the original media assets in accordance with the media formats. In one embodiment, the host computer may be aware of those of the formatted media assets already present on the media device and, in such case, the host computer may have already generated certain of the formatted media assets and thus need not generate them again. After the set of formatted media assets have been generated for each of the identified original media assets, the set of formatted media assets can be copied 214 to the media device. Optionally, the identified original media assets can also be copied to the media device.

The media device utilized in accordance with the present invention can store a large number of media assets. These media assets can be of the same type or different type of media asset. For example, one type of media asset is audio files, such as music or songs. Another type of media assets are images, such as photos. The media device includes a media memory that is able to store media assets that have been copied to the media device. However, media storage to the media memory is limited at the media device. Hence, it is not always possible to store all of the media assets that are to be copied to the media device within the media memory. As a result, another aspect of the invention uses different priority levels to prioritize which of the media assets should be stored to the media memory.

Figure 3:
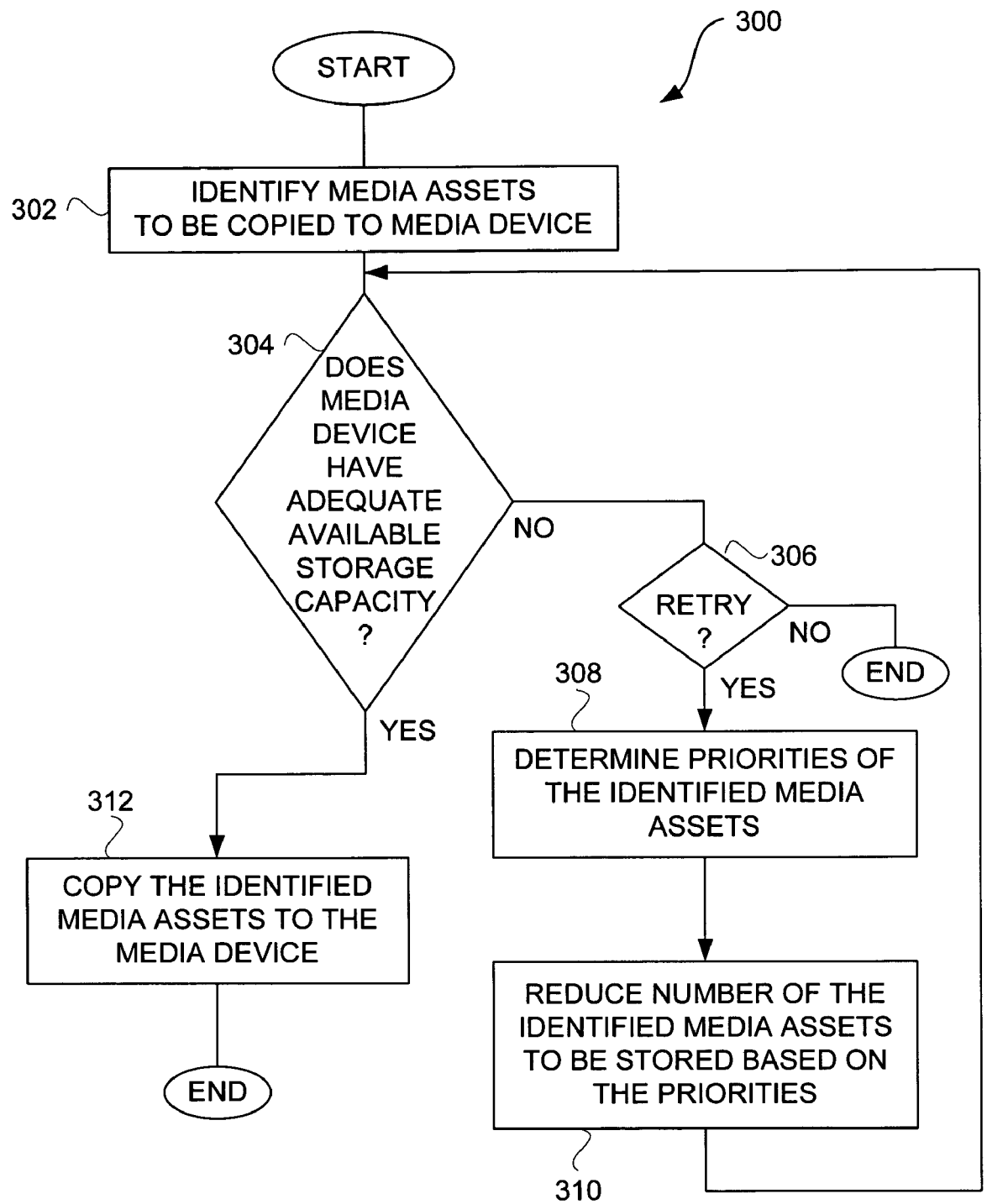
FIG. 3 is a flow diagram of a synchronization process according to another embodiment of the invention.

FIG. 3 is a flow diagram of a synchronization process 300 according to another embodiment of the invention. The synchronization process 300 is, for example, performed by a host computer, such as the host computer 104 illustrated in FIG. 1.

The synchronization process 300 initially identifies 302 media assets to be copied to a media device. A decision 304 then determines whether the media device has adequate available storage capacity to store all the identified media assets. In one embodiment, the available storage capacity for the media device can be determined by media device capabilities provided by the media device. For example, the media device might indicate that it has ten gigabytes of free space and five gigabytes of previously stored media assets. The available storage capacity can then be considered ten gigabytes or fifteen gigabytes depending upon user preference or depending on whether the presently stored media assets necessarily need to be maintained.

In any case, when the decision 304 determines that the media device does not have adequate available storage capacity, a decision 306 determines whether additional processing is desired to attempt to reduce the amount of storage capacity required. When the decision 306 determines that such additional processing is not desired, then the synchronization process 300 is complete and ends with no synchronization being performed. Alternatively, when the decision 306 determines that the additional processing is to be performed, priorities of the identified media assets are determined 308. Each of the identified media assets can have a priority or can be associated with a priority. Then, the number of the identified media assets is reduced 310 based on the priorities of the identified media assets. Following the operation 310, the synchronization process 300 returns to repeat the decision 304 and subsequent operations so that whether the media device now has adequate available storage capacity can be reevaluated.

Once the decision 304 determines that the media device has adequate available storage capacity, the identified media assets are copied 312 to the media device. Typically, when the identified media assets are copied 312, media information pertaining to the identified media assets can also copied from the host computer to the media database within the media device. Thereafter, the synchronization process 300 is complete and ends with synchronization having been performed, at least to the extent of available storage capacity.

Figure 4A:
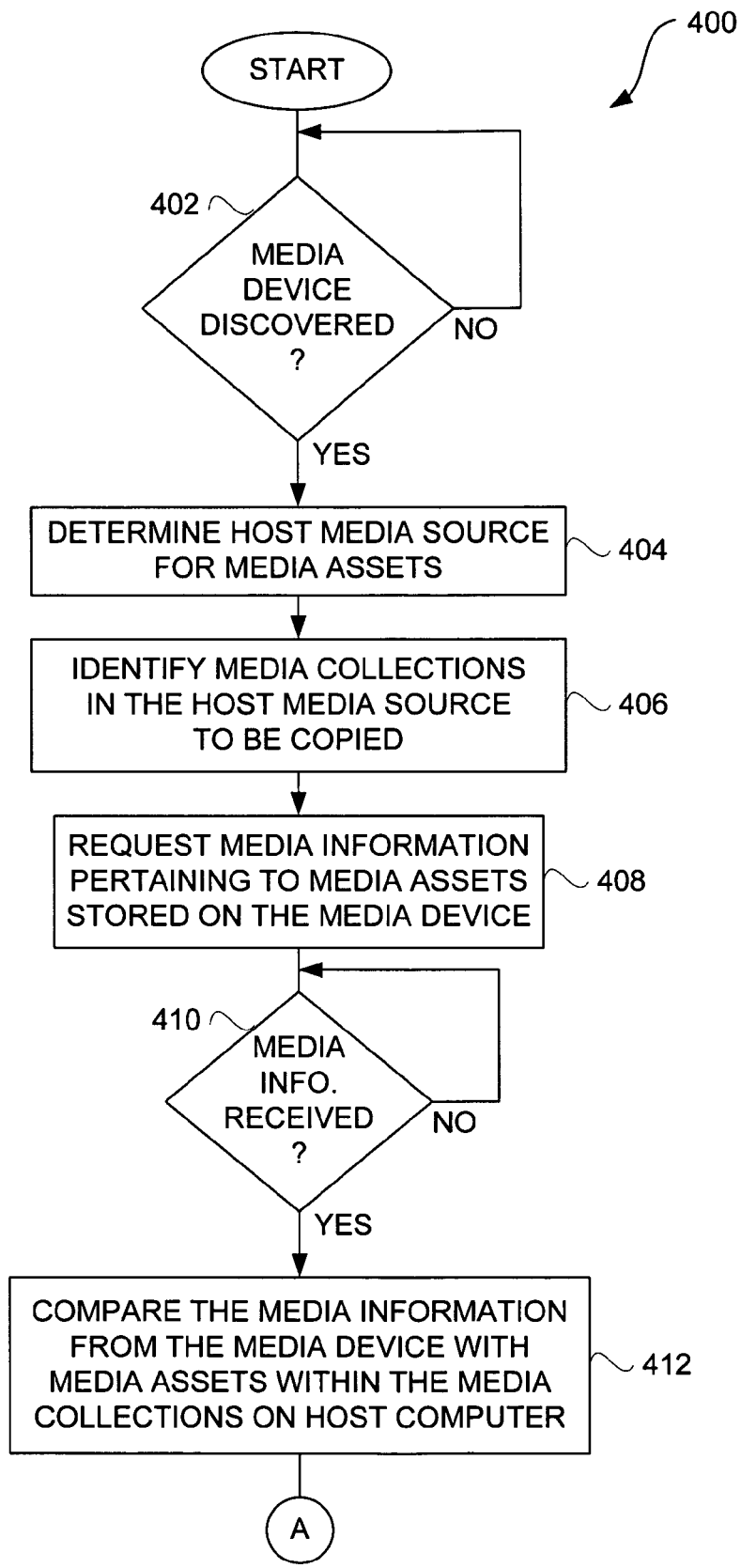
FIGS. 4A-4C are flow diagrams of a detailed synchronization process according to one embodiment of the invention.
Figure 4B:
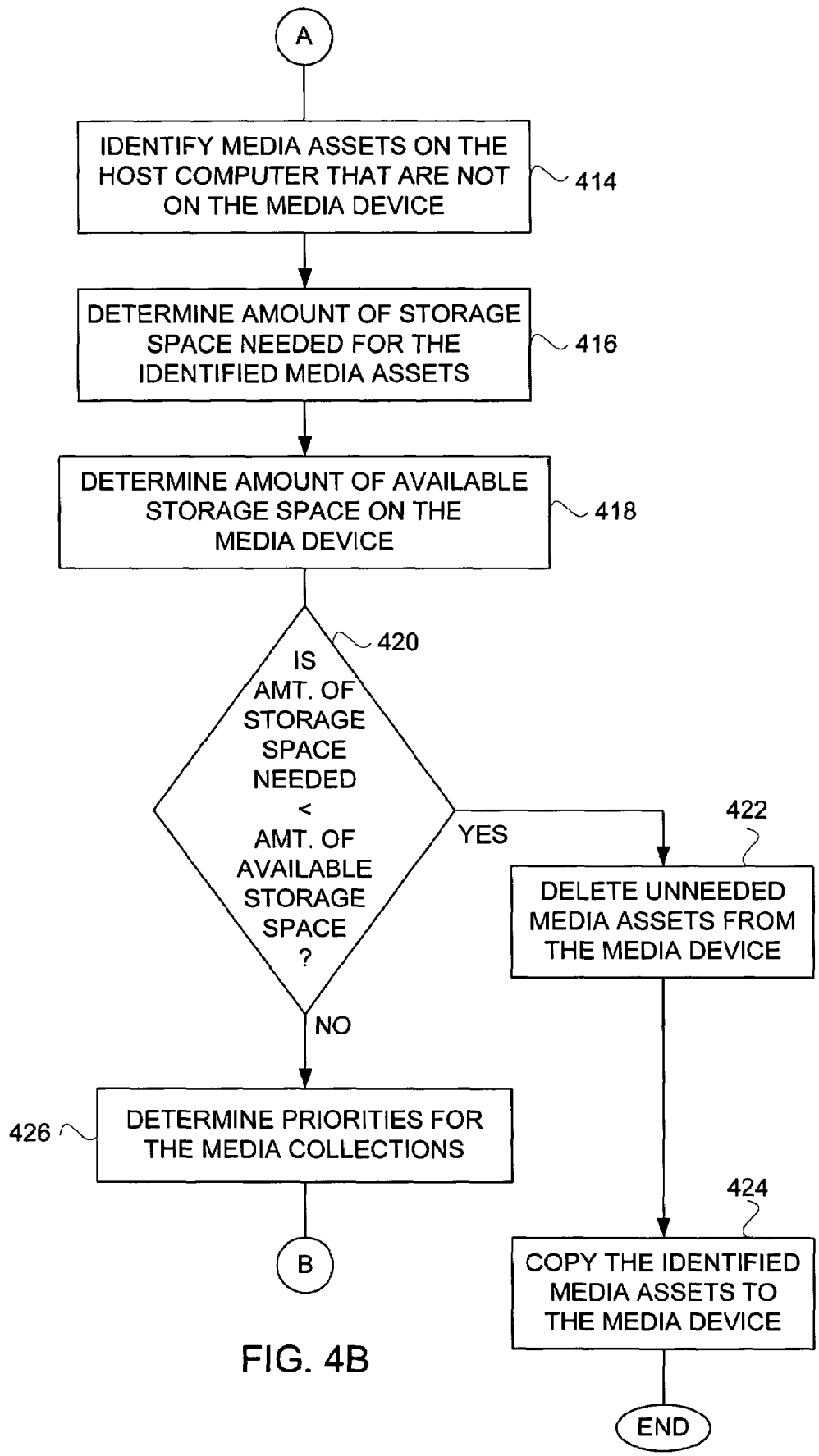
Figure 4C:
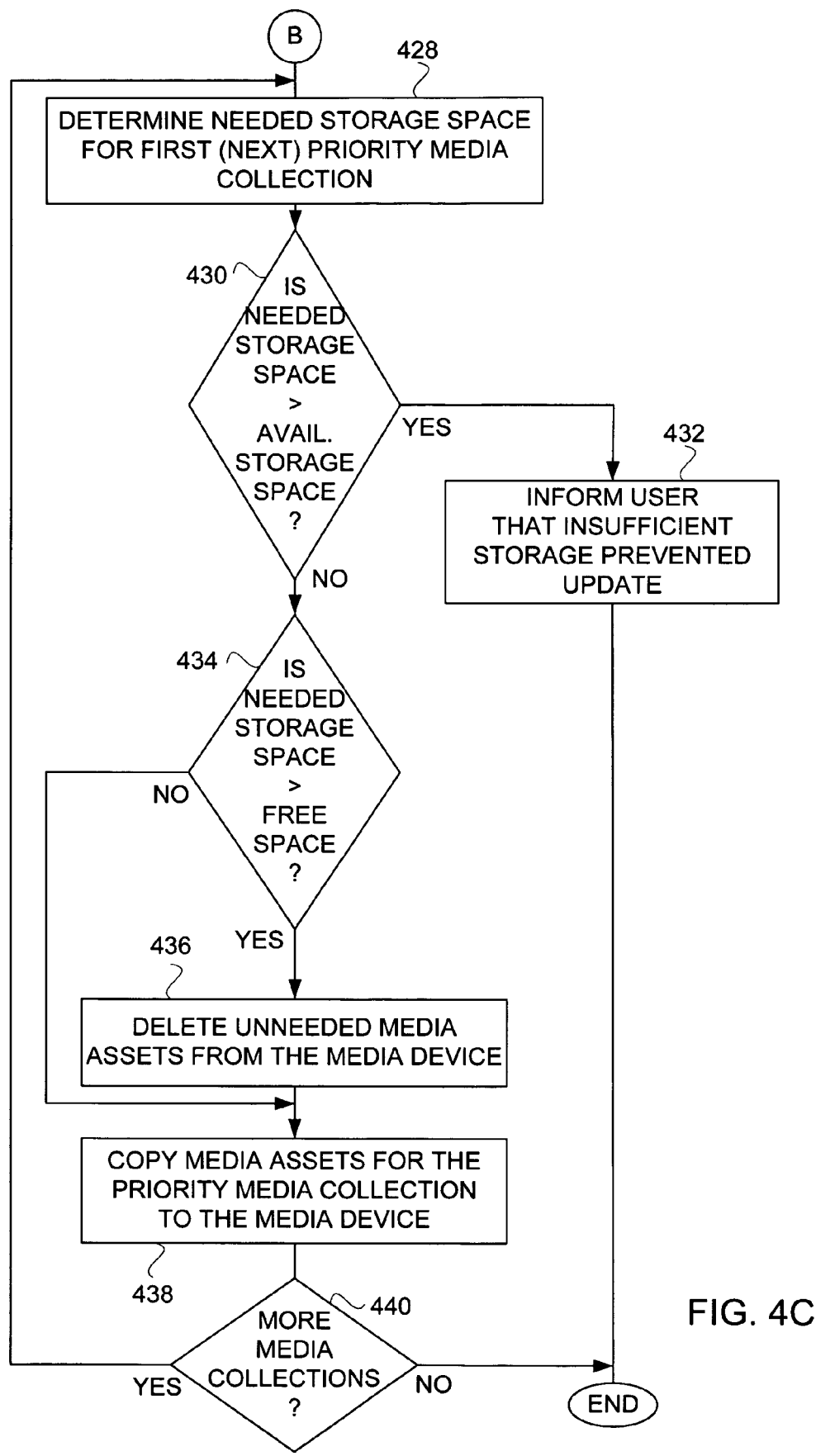

FIGS. 4A-4C are flow diagrams of a detailed synchronization process 400 according to one embodiment of the invention. The detailed synchronization process 400 is, for example, performed by a host computer, such as the host computer 104 illustrated in FIG. 1.

The synchronization process 400 begins with decision 402 that determines whether a media device has been discovered. Here, upon connection of a media device to the host computer, the host computer can detect or discover the presence of the media device. In such case, the host computer can automatically initiate a synchronization process. Hence, when the decision 402 determines that a media device has been discovered, the synchronization process 400 continues. In other words, the synchronization process 400 can be deemed invoked once a media device has been discovered.

When the synchronization process 400 continues, a host media source is determined 404 for media assets. Here, the host media source is typically determined by a user selection or setting with respect to a media management application. The host media source can pertain to a folder, library or grouping of media assets. Often, the host media source is associated with respect to an application program or file system. Next, media collections in the host media source to be copied are identified 406. Within the host media source, there are typically a plurality of media collections. These media collections can be indicated per user selections as to whether or not they are to be copied during the synchronization process 400. For example, when the media assets are photos, the media collections can pertain to photo albums.

Then, media information pertaining to media assets stored on the media device is requested 408. A decision 410 determines whether media information has been received from the media device. Once the media information from the media device has been received, the media information from the media device is compared 412 with those media assets within the media collections on the host computer. In one embodiment, the media information includes media attributes of the media assets which can be compared to determine which media assets are to be transferred. In one example, the media attributes include at least a title and an artist name for media assets that are audio files. In another example, the media attributes include an identifier, a modification date and a size for media assets that are image files. Based on the comparing 412, media assets on the host computer that are not on the media device are identified 414.

Next, an amount of storage space needed for the identified media assets is determined 416. In one embodiment, the size of the media assets are known or predetermined so that the amount of storage space required for the identified media assets can be computed at the host computer. In addition, an amount of available storage space on the media device is determined 418. This determination may be assisted by media device capabilities obtained from the media device. For example, the media device capabilities might indicate the amount free memory storage on the media device.

In any case, a decision 420 then determines whether the amount of storage space needed to store the identified media assets is less than the amount of available storage space on the media device. When the amount of storage space needed is less than the amount of available storage space, the synchronization can be immediately performed. Namely, any unneeded media assets can be deleted 422 from the media device, and the identified media assets can be copied 424 to the media device. It is not necessary that unneeded media assets be deleted 422, particularly when the memory device has sufficient free memory capacity to store the identified media assets without removing any of the previously stored media assets. After the identified media assets have been copied 424, the synchronization process 400 is complete and ends with the synchronization having been performed.

On the other hand, when the decision 420 determines that the amount of storage space needed is not less than the amount of available storage space, priorities for the media collections are determined 426. Here, it is assumed that the identified media assets are grouped into media collections, and that the media collections have a priority associated therewith. As explained in detail below with respect to FIG. 4C, the synchronization continues by synchronizing media assets of a media collection in accordance with the priority. Specifically, needed storage space for the priority media collection is determined 428. A decision 430 then determines whether the needed storage space for the first priority media collection is greater then the available storage space at the media device. When the needed storage space exceeds the available storage space, then the media collection is not able to be copied to the media device. In such case, the user can be informed 432 that insufficient storage prevented update (or further update). Thereafter, the synchronization process is complete and ends given that inadequate available storage space exists on the media device. It should be noted that the available storage space on the media device can consider previously stored media assets (of at least certain media types) to be part of the available storage space.

Alternatively, when the decision 430 determines that the needed storage space for storage of the priority media collection is not greater than the available storage space on the media device, a decision 434 determines whether the needed storage space is greater the amount of free space on the media device. When the decision 434 determines that the needed storage space exceeds free space, then any unneeded media assets can be deleted 436 from the media device to free up additional available storage space. Optionally, prior to such deletion 436, a user warning or dialog can be presented to a user and enable the user to abort the synchronization process 400. Alternatively, when the needed storage space does not exceeds the free space, the operation 436 can be bypassed so that unneeded media assets need not necessarily be deleted 436 from the media device.

Following the operation 436, or its being bypassed, media assets for the priority media collection are copied 438 to the media device. Thereafter, a decision 440 determines whether more media collections are to be similarly processed. When the decision 440 determines that more media collection are to be processed, then the synchronization process 400 returns to repeat the operation 428 and subsequent operations so that a next priority media collection can be similarly processed. Alternatively, when the decision 440 determines that there are no more media collections to be processed, the synchronization process 400 is complete and ends.

Figure 5A:
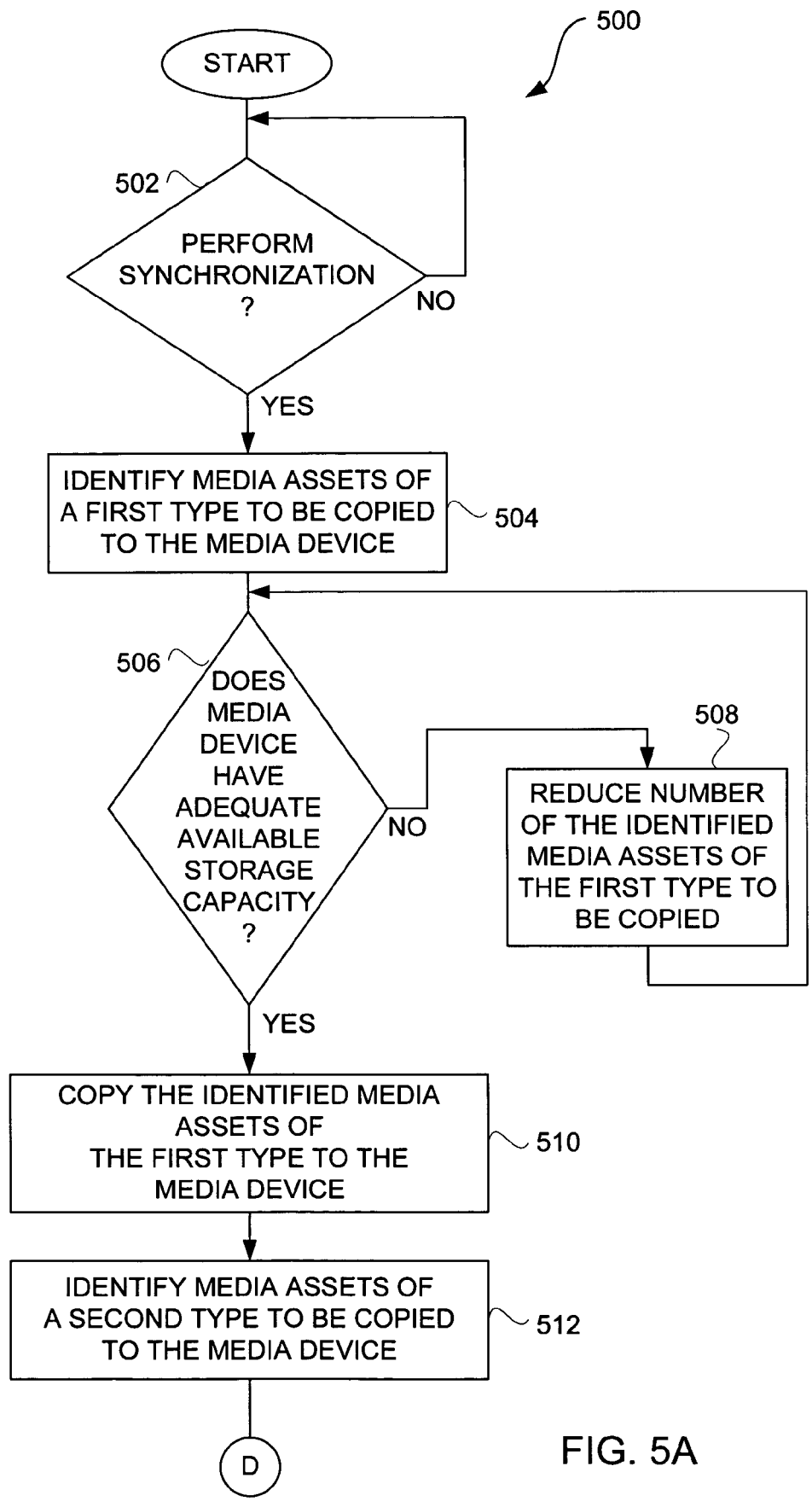
FIGS. 5A and 5B are flow diagrams of a multiple media synchronization process according to one embodiment of the invention.
Figure 5B:
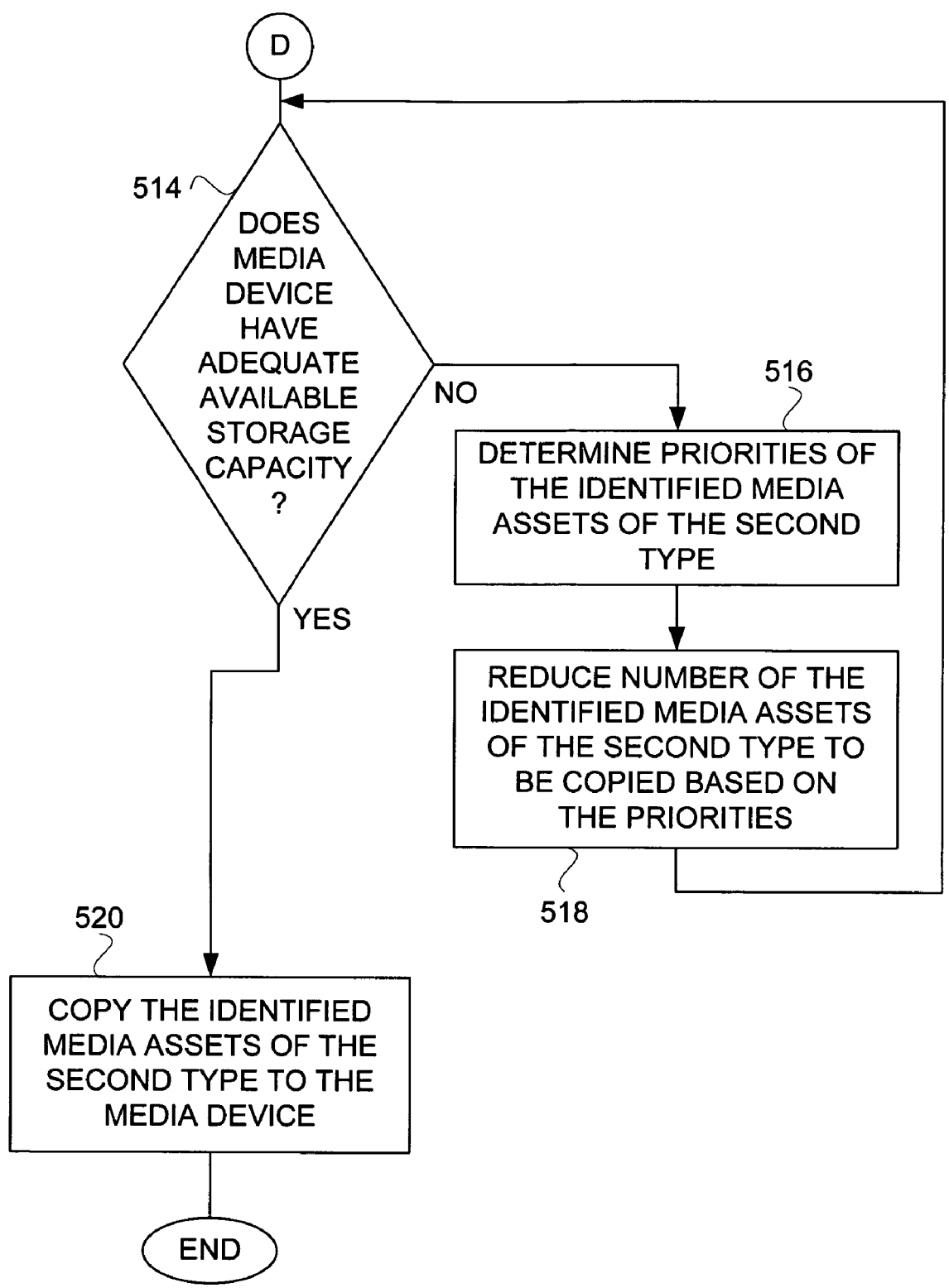

FIGS. 5A and 5B are flow diagrams of a multiple media synchronization process 500 according to one embodiment of the invention. The multiple media synchronization process 500 is, for example, performed by a media manager of a host computer, such as the media manager 106 illustrated in FIG. 1. Here, the multiple media can pertain to different types of media assets. For example, one type of media assets can be audio files, such as songs, and another type of media assets can pertain to images, such as photos.

The multiple media synchronization process 500 begins with a decision 502 that determines whether synchronization is to be performed. Synchronization can be requested by a user or automatically by the media manager. When the decision 502 determines that synchronization is not to be performed, the multiple media synchronization process 500 awaits the need for synchronization. In other words, the multiple media synchronization process 500 can be deemed to be activated when synchronization is to be performed.

Once synchronization is to be performed, media assets of a first type that are to be copied to the media device are identified 504. A decision 506 then determines whether the media device has adequate available storage capacity. The available storage capacity at the media device includes at least free space of the storage memory within the media device but can also include storage capacity associated with previously stored media assets that can be deleted. In any case, when the decision 506 determines that the media device does not have adequate available storage capacity, the number of the identified media assets of the first type to be copied can be reduced 508. Following the reduction 508, the multiple media synchronization process 500 returns to repeat the decision 506 to reconsider whether there is now adequate available storage capacity. Once the decision 506 determines that the media device has adequate available storage capacity, the identified media assets of the first type are copied 510 to the media device. Additionally, the media assets as stored at the host computer and the media device include media databases, and when media assets are copied, associated database information for such media assets can also copied.

Next, media assets of a second type to be copied to the media device are identified 512. A decision 514 then determines whether the media device has adequate available storage capacity. It should be noted that the available storage capacity of the media device considered at the decision 514 can consider all previously stored media assets of the second type as being available. If such storage space is needed, the previously stored media assets of the second type can be deleted from the memory storage of the media device.

In any case, when the decision 514 determines that the media device does not have adequate available storage capacity, priorities of the identified media assets of the second type are determined 516. Then, the number of the identified media assets of the second type that are to be copied is reduced 518 based on the priorities. Here, given that the media assets of the first type have already been copied to the media device, the media device offers less available storage capacity to store media assets of the second type. Hence, it is possible that the media device is unable to store any of the identified media assets of the second type. Further, it should be noted that the media assets of the second type can be grouped into collections, and that the reduction 518 of the number of the identified media assets of the second type can be performed in accordance with a collection so that the reduction process eliminates identified media assets on a collection basis. In any case, following the operation 518, the multiple media synchronization process 500 returns to repeat the decision 514 so that the determination of whether the media device has adequate available storage capacity can be reexamined.

In any event, once the decision 514 determines that the media device has adequate available storage capacity the identified media assets for the second type are copied 520 to the media device. Again, any associated database information can also be copied to the media device. Following the operation 520, the multiple media synchronization process 500 is complete and ends.

As previously noted, synchronization is a form of media management. The ability to automatically initiate synchronization was also previously discussed. Still further, however, the synchronization between devices can be restricted so as to prevent automatic synchronization when the host computer and media device do not recognize one another.

According to one embodiment, when a media device is first connected to a host computer (or even more generally when matching identifiers are not present), the user of the media device is queried as to whether the user desires to affiliate, assign or lock the media device to the host computer. When the user of the media device elects to affiliate, assign or lock the media device with the host computer, then a pseudo-random identifier is obtained and stored in either the media database or a file within both the host computer and the media device. In one implementation, the identifier is an identifier associated with (e.g., known or generated by) the host computer or its management module and such identifier is sent to and stored in the media device. In another implementation, the identifier is associated with (e.g., known or generated by) the media device and is sent to and stored in a file or media database of the host computer.

Figure 6:
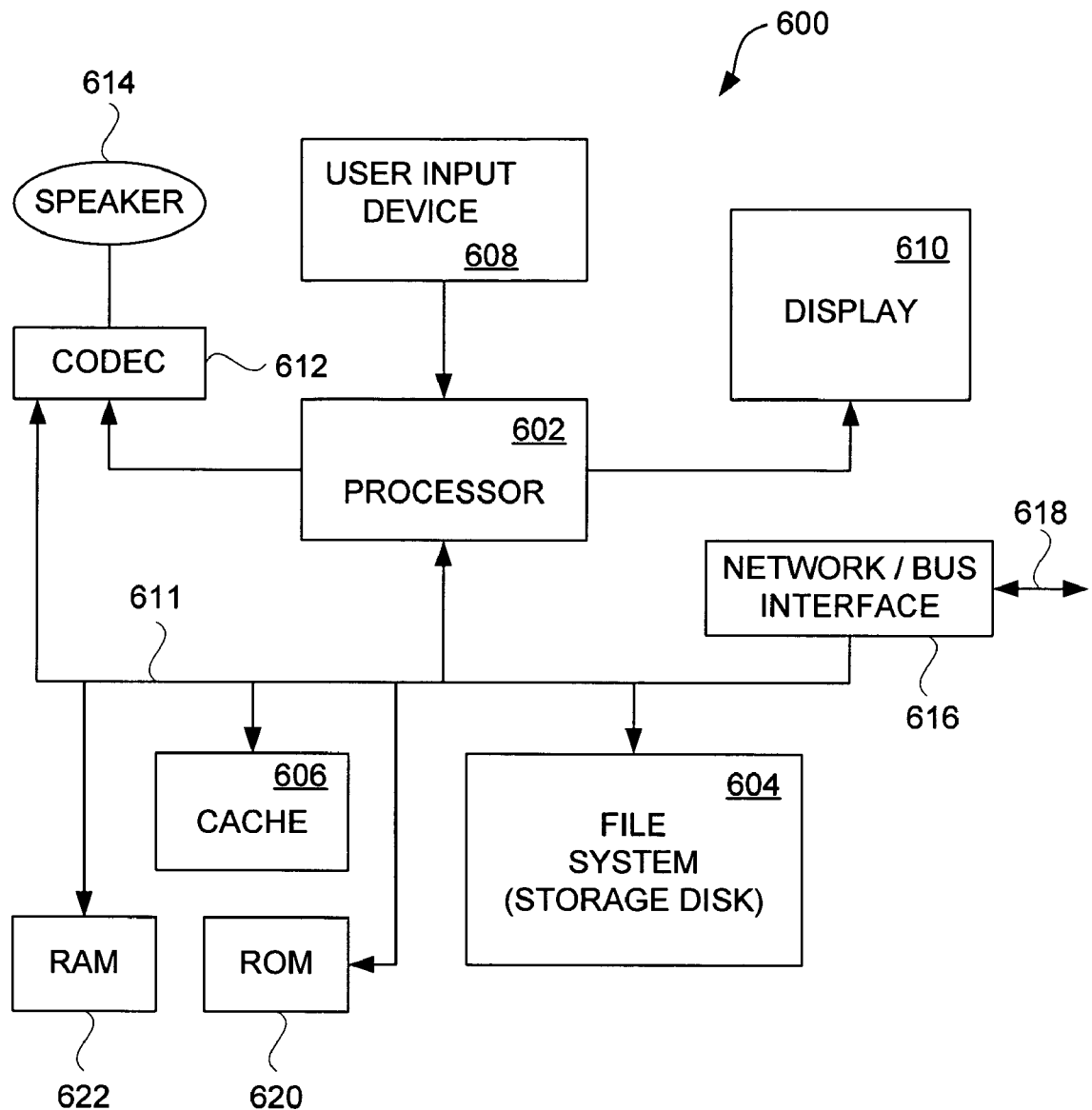
FIG. 6 is a block diagram of a media device according to one embodiment of the invention.

FIG. 6 is a block diagram of a media device 600 according to one embodiment of the invention. The media device 600 includes a processor 602 that pertains to a microprocessor or controller for controlling the overall operation of the media device 600. The media device 600 stores media data pertaining to media assets in a file system 604 and a cache 606. The file system 604 is, typically, a storage disk or a plurality of disks. The file system 604 typically provides high capacity storage capability for the media device 600. However, since the access time to the file system 604 is relatively slow, the media device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The power consumption is often a concern when the media device 600 is a portable media device that is powered by a battery (not shown). The media device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The media device 600 also includes a user input device 608 that allows a user of the media device 600 to interact with the media device 600. For example, the user input device 608 can take a variety of forms, such as a button, keypad, dial, etc. Still further, the media device 600 includes a display 610 (screen display) that can be controlled by the processor 602 to display information (including media assets, such as images) to the user. A data bus 611 can facilitate data transfer between at least the file system 604, the cache 606, the processor 602, and the CODEC 612.

In one embodiment, the media device 600 serves to store a plurality of media assets (e.g., songs) in the file system 604. When a user desires to have the media device 600 play a particular media asset, a list of available media assets is displayed on the display 610. Then, using the user input device 608, a user can select one of the available media assets. The processor 602, upon receiving a selection of a particular media asset, supplies the media data (e.g., audio file) for the particular media asset to a coder/decoder (CODEC) 612. The CODEC 612 then produces analog output signals for a speaker 614. The speaker 614 can be a speaker internal to the media device 600 or external to the media device 600. For example, headphones or earphones that connect to the media device 600 would be considered an external speaker.

In another embodiment, the media device 600 serves to store a plurality of media assets (e.g., images) in the file system 604. When a user desires to have the media device 600 display a particular media asset, a list of available media assets (e.g., by names or by thumbnail images, or by collections) can be displayed on the display 610. Then, using the user input device 608, a user can select one of the available media assets. Alternatively, the user can request a slide show to display a sequence of images (e.g., a collection of images). The processor 602, upon receiving a selection of one or more media assets, supplies the media data (e.g., image file(s)) for the particular media asset(s) to the display 610 where the image(s) are display for the user. As noted above, the image file(s) can be formatted (e.g., rendered) in advance at the host computer so that display of the image file(s) at the media device 600 is responsive and efficient (in terms of processing operations and power consumption at the media device).

The media device 600 also includes a network/bus interface 616 that couples to a data link 618. The data link 618 allows the media device 600 to couple to a host computer. The data link 618 can be provided over a wired connection or a wireless connection. In the case of a wireless connection, the network/bus interface 616 can include a wireless transceiver.

In general, the media player can correspond to one or more of: a music player, game player, video player, camera, mobile telephone (e.g., cell phone), personal digital assistant (PDA), and/or the like.

The host computer can also be a media device. In such case, the synchronization of media items can between two media devices.

The various aspects, embodiments, implementations or features of the invention can be used separately or in any combination.

Although the media assets in several of the above embodiments where images (e.g., photos), the media assets are not limited to images. For example, the media assets can alternatively, pertain to audio (e.g., songs), videos (e.g., movies) or images (e.g., photos), as different types of media assets. Also, as noted above, the different types of media assets can also be used together of host computers and media devices.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that a user of a portable media device is able to quickly and easily display media assets (e.g., images) that have been downloaded to the portable media device. Another advantage of the invention is that a portable media device can receive media assets (e.g., images) from a host computer in one or more formats that are useful to the portable media device. Still another advantage of the invention is that media assets (e.g., images) can be synchronized in accordance with priorities as to media types and/or priorities as to media collections. Still another advantage of the invention is that synchronization can be automatically initiated and performed upon connection of a media device to a host computer.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for providing media assets to a media device from a host computer, said method comprising:
   obtaining media device capabilities for the media device;
   identifying original media assets on the host computer that are to be copied to the media device;
   determining media formats appropriate for the media device based on the media device capabilities;
   generating at the host computer, for each of the plurality of original media assets, a set of formatted media assets in accordance with the determined media formats for the media device, wherein the set of formatted media assets includes two or more different media format renderings for each of the original media assets that have been identified, and each of the two or more different media format renderings being provided as a separate file and being in accordance with the determined media formats appropriate for the media device; and
   copying the set of formatted media assets to the media device,
   wherein said generating of the set of formatted media assets in accordance with the media formats includes at least:
      determining whether the media device already stores one or more of the formatted media assets in the set of formatted media assets to be generated; and
      avoiding generation of the formatted media assets in the set of formatted media assets that are determined to be already stored on the media device.

2. A method as recited in claim 1, wherein the media assets are images.

3. A method as recited in claim 2, wherein the media formats are image formats.

4. A method as recited in claim 2, wherein the media formats pertain to different pixel sizes.

5. A method as recited in claim 2, wherein the media formats include one or more of NTSC, PAL or HDTV formats.

6. A method as recited in claim 1, wherein the formatted media assets are rendered media assets.

7. A method as recited in claim 1, wherein at least one of the two or more different media format renderings for at least one of the original media assets that have been identified is not directly presentable by the media device but is indirectly presentable by the media device on a media output device.

8. A method as recited in claim 1, wherein said method further comprises:
   determining whether a particular use of media assets is supported by the media device based on the media device capabilities; and
   bypassing said identifying, said determining, said generating and said copying when it is determined that the particular use of media assets is not supported by the media device.

9. A method as recited in claim 1, wherein the media assets are images, the media formats are image formats, and the formatted media assets are rendered media assets.

10. A method as recited in claim 1, wherein the media assets have a data size, and wherein the data size of each of the formatted media assets is substantially smaller than that the data size of the corresponding original media asset.

11. A method as recited in claim 1, wherein said method is automatically performed once the host computer detects a connection with the media device.

12. A method as recited in claim 1, wherein said identifying is based on at least one user setting.

13. A method as recited in claim 1, wherein said identifying comprises:
  determining a host media source for the media assets;
  identifying media collections in the host media source to be copied; and
  determining media assets within the identified media collections that are not already stored on the media device, thereby identifying the identified media assets residing on the host computer that are to be copied to the media device.

14. A method as recited in claim 13, wherein the media assets have a data size, and wherein the data size of each of the formatted media assets is substantially smaller that the data size of the corresponding original media asset.

15. A method as recited in claim 1, wherein at least one of the sets of the formatted media assets includes a first media asset formatted for playback on the media device and a second media asset formatted for playback on another media output device.

16. A computer readable storage medium including at least executable computer program code tangibly stored thereon for providing media assets to a media device from a host computer, said computer readable medium comprising:
  computer program code for obtaining media device capabilities of the media device;
  computer program code for identifying original media assets on the host computer that are to be copied to the media device;
  computer program code for determining media formats appropriate for the media device based on the media device capabilities;
  computer program code for generating at the host computer, for each of the plurality of original media assets, a set of formatted media assets in accordance with the determined media formats for the media device, wherein the set of formatted media assets includes two or more different media format renderings for each of the original media assets that have been identified, and each of the two or more different media format renderings being provided as a separate file and being in accordance with the determined media formats appropriate for the media device; and
  computer program code for copying the set of formatted media assets to the media device,
  wherein said computer program code for generating the set of formatted media assets in accordance with the media formats operates to (i) determine whether the media device already stores one or more of the formatted media assets in the set of formatted media assets to be generated, and (ii) avoid generation of the formatted media assets in the set of formatted media assets that are determined to be already stored on the media device.

17. A computer readable storage medium as recited in claim 16, wherein the formatted media assets are rendered media assets.

18. A computer readable storage medium as recited in claim 17, wherein at least said computer program code for copying is automatically performed once the host computer detects a connection with the media device.

19. A computer readable storage medium as recited in claim 17, wherein the media formats include one or more of NTSC, PAL or HDTV formats.

20. A computer readable storage medium as recited in claim 19, wherein said identifying is based on at least one user setting.

21. A computer readable storage medium as recited in claim 16, wherein said computer program code for identifying comprises:
  computer program code for determining a host media source for the media assets;
  computer program code for identifying media collections in the host media source to be copied; and
  computer program code for determining media assets within the identified media collections that are not already stored on the media device, thereby identifying the identified media assets residing on the host computer that are to be copied to the media device.

22. A computer readable storage medium as recited in claim 21, wherein the media assets have a data size, and wherein the data size of each of the formatted media assets is substantially smaller that the data size of the corresponding original media asset.

23. A computer readable storage medium as recited in claim 16, wherein at least said computer program code for copying is automatically performed once the host computer detects a connection with the media device.

24. A computer readable storage medium as recited in claim 16, wherein the media formats include one or more of NTSC, PAL or HDTV formats.

25. A computer readable storage as recited in claim 16, wherein at least one of the two or more different media format renderings for at least one of the original media assets that have been identified is not directly supported by the media device but is indirectly supported by the media device on a media output device.

26. A computing apparatus for providing media assets to a media device, said computing apparatus comprising:
  an input/output interface that detects connection with the media device;
  a data store that stores the media assets; and
  a processor configured to obtain media device capabilities of the media device, identify original media assets on the host computer that are to be copied to the media device, determine media formats based on the media device capabilities, generate at the host computer, for each of the original media assets, a set of formatted media assets in accordance with the media formats, and copy the set of formatted media assets to the media device,
  wherein the set of formatted media assets include two or more different media format renderings for a plurality of the original media assets that have been identified, and each of the two or more different media format renderings being provided as a separate file and being in accordance with the determined media formats appropriate for the media device, and
  wherein generation of the set of formatted media assets in accordance with the media formats includes at least (i) determining whether the media device already stores one or more of the formatted media assets in the set of formatted media assets to be generated, and (ii) avoiding generation of the formatted media assets in the set of formatted media assets that are determined to be already stored on the media device.

27. A computing apparatus as recited in claim 26, wherein the media formats being determined are those requested by the media device.

28. A computing apparatus as recited in claim 26, wherein the media formats being determined are those requested by at least one user setting.

29. A computing apparatus as recited in claim 26, wherein at least one of the sets of the formatted media assets includes a first media asset formatted for playback on the media device and a second media asset formatted for playback on another media output device.

30. A system for providing media assets to a media device, said system comprising:

a host computer;

means for obtaining media device capabilities of the media device;

means for identifying original media assets on the host computer that are to be copied to the media device;

means for determining media formats appropriate for the media device based on the media device capabilities;

means for generating at the host computer, for each of the plurality of original media assets, a set of formatted media assets in accordance with the determined media formats for the media device, wherein the set of formatted media assets includes two or more different media format renderings for a plurality of the original media assets that have been identified, and each of the two or more different media format renderings being provided as a separate file and being in accordance with the determined media formats appropriate for the media device; and means for copying the set of formatted media assets to the media device, wherein said means for generating the set of formatted media assets in accordance with the media formats operates to (i) determine whether the media device already stores one or more of the formatted media assets in the set of formatted media assets to be generated, and (ii) avoid generation of the formatted media assets in the set of formatted media assets that are determined to be already stored on the media device.

31. A system as recited in claim 30, wherein for at least one of the original media assets that have been identified, the set of formatted media assets includes more than two different media format renderings for the at least one of the original media assets.

* * * * *

UNITED STATES PATENT AND TRADEMARK OFFICE
CERTIFICATE OF CORRECTION

| | |
|---|---|
| PATENT NO. | : 7,680,849 B2 |
| APPLICATION NO. | : 10/973925 |
| DATED | : March 16, 2010 |
| INVENTOR(S) | : David Heller et al. |

Page 1 of 1

It is certified that error appears in the above-identified patent and that said Letters Patent is hereby corrected as shown below:

On the face page, in field (56), under "Other Publications", in column 2, line 1, delete "Columist" and insert -- Columnist --, therefor.

On page 3, under "Other Publications", in column 2, line 25, delete "verions" and insert -- versions --, therefor.

On page 3, under "Other Publications", in column 2, line 37, delete "develper" and insert -- developer --, therefor.

On page 4, under "Other Publications", in column 1, line 4, delete "Preference"," and insert -- Preferences", --, therefor.

On Sheet 2 of 9, in Reference Numeral 208, Figure 2, line 1, delete "IDENITFY" and insert -- IDENTIFY --, therefor.

In column 14, line 66, in Claim 10, after "than" delete "that".

In column 15, line 18, in Claim 14, delete "that" and insert -- than --, therefor.

In column 16, line 19, in Claim 22, delete "that" and insert -- than --, therefor.

Signed and Sealed this
Eighth Day of November, 2011

David J. Kappos
*Director of the United States Patent and Trademark Office*